(12) United States Patent
Frank et al.

(10) Patent No.: US 6,467,854 B2
(45) Date of Patent: Oct. 22, 2002

(54) BRAKING PRESSURE MODULATOR FOR A TRAILER WITH ELECTRONIC BRAKING SYSTEM

(75) Inventors: Dieter Frank, Hannover; Gerdt Schreibert, Isernhagen; Peter Homann, Neustadt; Armin Sieker, Bielefeld; Andreas Kranz, Wunstorf; Hans-Klaus Wolff, Springe; Dirk Meier, Seelze, all of (DE)

(73) Assignee: WABCO GmbH & Co., OHG (DE)

( * ) Notice: Subject to any disclaimer, the term of this patent is extended or adjusted under 35 U.S.C. 154(b) by 0 days.

(21) Appl. No.: 09/792,411

(22) Filed: Feb. 23, 2001

(65) Prior Publication Data

US 2002/0124893 A1 Sep. 12, 2002

(30) Foreign Application Priority Data

Feb. 26, 2000  (DE) .......................... 100 09 117

(51) Int. Cl.[7] .................................................. B60T 8/34
(52) U.S. Cl. ............................... 303/118.1; 137/596.17
(58) Field of Search ................... 137/596.17; 303/118.1

(56) References Cited

U.S. PATENT DOCUMENTS

| 4,102,526 | A |   | 7/1978  | Hargraves |             |
|-----------|---|---|---------|-----------|-------------|
| 4,245,815 | A |   | 1/1981  | Willis    |             |
| 5,127,434 | A |   | 7/1992  | Kline et al. |          |
| 5,577,322 | A |   | 11/1996 | Ohshita et al. |        |
| 5,823,507 | A |   | 10/1998 | Inden et al. |          |
| 5,845,672 | A |   | 12/1998 | Reuter et al. |         |
| 6,000,679 | A |   | 12/1999 | Reuter et al. |         |
| 6,206,481 | B1 | * | 3/2001 | Kaisers et al. | ........ 303/118.1 X |

FOREIGN PATENT DOCUMENTS

| DE | 27 57 803    | 6/1979  |
|----|--------------|---------|
| DE | 33 08 279    | 9/1984  |
| DE | 42 27 084    | 2/1994  |
| DE | 195 04 883   | 11/1996 |
| DE | 196 09 222   | 9/1997  |
| DE | 199 18 070   | 12/1999 |
| DE | 196 36 432   | 6/2000  |
| DE | 197 30 276   | 8/2000  |
| EP | 0 478 953 A1 | 4/1992  |
| EP | 0 499 670    | 8/1992  |
| EP | 0 856 447 A2 | 8/1998  |
| EP | 0 893 636    | 1/1999  |
| EP | 0 837 274    | 8/1999  |
| EP | 1 022 204 A2 | 7/2000  |
| GB | 1 389 055    | 4/1975  |
| WO | WO 99/51901  | 10/1999 |

* cited by examiner

Primary Examiner—Gerald A. Michalsky
(74) Attorney, Agent, or Firm—Proskauer Rose LLP

(57) ABSTRACT

A pre-engagement unit for a braking pressure modulator for a pressure regulating circuit of an electronic braking system includes an electrically actuated valve system with three substantially identical 2/2-way solenoid valves. First and second terminals of the 2/2-way solenoid valves are selectively connected to the pneumatic inlets and output terminals of the pre-engagement unit, and to each other so that the first 2/2-way valve serves as an air admission valve for supply pressure, the second 2/2-way solenoid valve serves as an air admission/exhaust valve for redundancy pressure, and the third 2/2-way solenoid valve serves as an exhaust valve. Thereby, the pressure in the pressure regulating circuit can be increased, decreased, or maintained. Desirably, the first, second, and third 2/2-way solenoid valves are connected in parallel to each other.

12 Claims, 6 Drawing Sheets

BRAKING PRESSURE MODULATOR FOR A TRAILER WITH ELECTRONIC BRAKING SYSTEM

BACKGROUND OF THE INVENTION

The invention relates to a braking pressure modulator.

German patent document DE 42 27 084 A1 discloses a braking pressure modulator, designated therein as a pressure regulating module.

This known patent shows a two-channel pressure regulating module in FIG. 2 in which a common 3/2-way solenoid valve (therein 12) is provided as a reversing valve that connects both channels via a line (therein 15) either to the supply pressure (therein 17) in the actuated state of the valve 12, or to a control pressure (therein 13) in the non-actuated state of the valve 12. For purposes of this discussion, it shall be assumed that the 3/2-way solenoid valve 12 of DE 42 27 084 A1 is actuated, so that the supply pressure is being supplied to the other solenoid valves in FIG. 2. This represents the case of pressure regulation.

One of the two symmetrically configured pressure regulating circuits in DE 42 27 084 A1, i.e., the one containing the valves 9', 7 and 3, is now considered. The 3/2-way solenoid valve (therein 9') determines the direction of any pressure change in this circuit. In the non-actuated state of valve 9' (as shown in FIG. 2 therein), a pressure increase takes place in this circuit since the supply pressure 17 is taking effect. In the actuated state of valve 9', a pressure lowering takes place due to the connection of valve 9' to the exhaust (therein 11'). The 2/2-way solenoid valve (therein 7) is connected in series to the valve 9' and either establishes a connection to a control inlet of the downstream relay valve (therein control inlet 5) in its non-actuated state (as shown in FIG. 2), or closes off this control inlet in its actuated valve position.

Due to the series connection of the two valves 7 and 9', these must jointly be brought into a given state in order to achieve a desired pressure change at the control inlet 5. Thus, they are not independent of each other but can only be operated simultaneously and together. This represents a cost disadvantage because the utilization of a 3/2-way solenoid valve with reversing function (i.e., valve 9'), and the requirement of great tightness in fitting at the two corresponding valve seats, are relatively expensive.

It is therefore the object of the invention to modify a pre-engagement unit of a braking pressure modulator of this type in such manner that the manufacturing costs are reduced.

SUMMARY OF THE INVENTION

This object is achieved in a pre-engagement unit for a braking pressure modulator for a pressure regulating circuit of an electronic braking system. The inventive pre-engagement unit comprises a first pneumatic inlet through which a supply pressure is supplied to the pre-engagement unit, a second pneumatic inlet through which a redundancy pressure is supplied to the pre-engagement unit, a first pneumatic output terminal through which the pre-engagement unit is connected to an air quantity augmenting relay valve, a second pneumatic output terminal through which the pre-engagement unit is connected to a pressure sink, and an electrically actuated valve system. The electrically actuated valve system comprises three substantially identical 2/2-way solenoid valves. Each of the 2/2-way solenoid valves includes first and second pneumatic terminals, and an electric terminal which is connected to an electronic control system of the electronic braking system for selective actuation of the 2/2-way solenoid valves. The first and second terminals of the 2/2-way solenoid valves are selectively connected to the pneumatic inlets and output terminals of the pre-engagement unit and to each other so that the first 2/2-way valves serves as an air admission valve for supply pressure to the pressure regulating circuit, the second 2/2-way solenoid valve serves as an air admission/exhaust valve for redundancy pressure to the pressure regulating circuit, and the third 2/2-way solenoid valve serves as an exhaust valve for the pressure regulating circuit. Thereby, the pressure in the pressure regulating circuit can be increased, decreased, or maintained. Desirably, the first, second, and third 2/2-way solenoid valves are connected in parallel to each other.

In the known patent document DE 42 27 084 A1, the suggestion is made through various embodiments to achieve economy by reducing the number of solenoid valves and thereby to save on pneumatic channels and similar components. The present invention abandons the idea to a great extent that the number of solenoid valves as such is the most important factor in saving costs. In the present invention, the average number of 3 solenoid valves per channel is even slightly greater than the average number of 2.5 solenoid valves per channel in the known patent. Instead, the invention emphasizes a novel valve design and a pneumatic circuit by means of which the solenoid valves of this novel valve design can be operated optimally.

The invention has the advantage that the pre-engagement unit of a pressure regulating circuit has three 2/2-way solenoid valves of very similar configuration connecting in parallel to each other rather than a 3/2-way solenoid valve connected in series to a 2/2-way solenoid valve.

By contrast to the known patent, in which a 3/2-way solenoid valve (therein 9') is used as a reversing valve which leads to a reduced pulsating rate due to the design of such valves, the invention also has the advantage of an improved response time.

Because of the similarity of the 2/2-way solenoid valves, the armatures and the solenoid valves are standardized in another further development of the invention and, by using armatures of the same type made in larger quantities, costs are reduced.

Thus, three 2/2-way solenoid valves can be combined in one pre-engagement unit of a pressure regulating circuit and based on another further development of the invention, the magnet coils which are of identical construction, including the armatures, can be combined into the compact assembly of a triple magnet coil unit which can be extrusion coated (according to another further development of the invention). The triple magnet coil unit is thus available as a pre-assembled unit for integration into the electronic system of a braking pressure modulator. According to another further development, the magnet coil assembly interfaces with the electronic system advantageously by means of simply being plugged in.

Another further development of the invention has the advantage that the armatures can be made in a particularly space-saving manner by employing sealing seats that form metal-to-metal seals when the solenoid valves are under current. The utilization of such sealing seats is made possible by a specially designed pneumatic circuitry system.

BRIEF DESCRIPTION OF THE DRAWINGS

The invention is described in greater detail below through the example of embodiments shown in the drawings, wherein.

DETAILED DESCRIPTION OF PREFERRED EMBODIMENTS OF THE INVENTION

Figure 7:
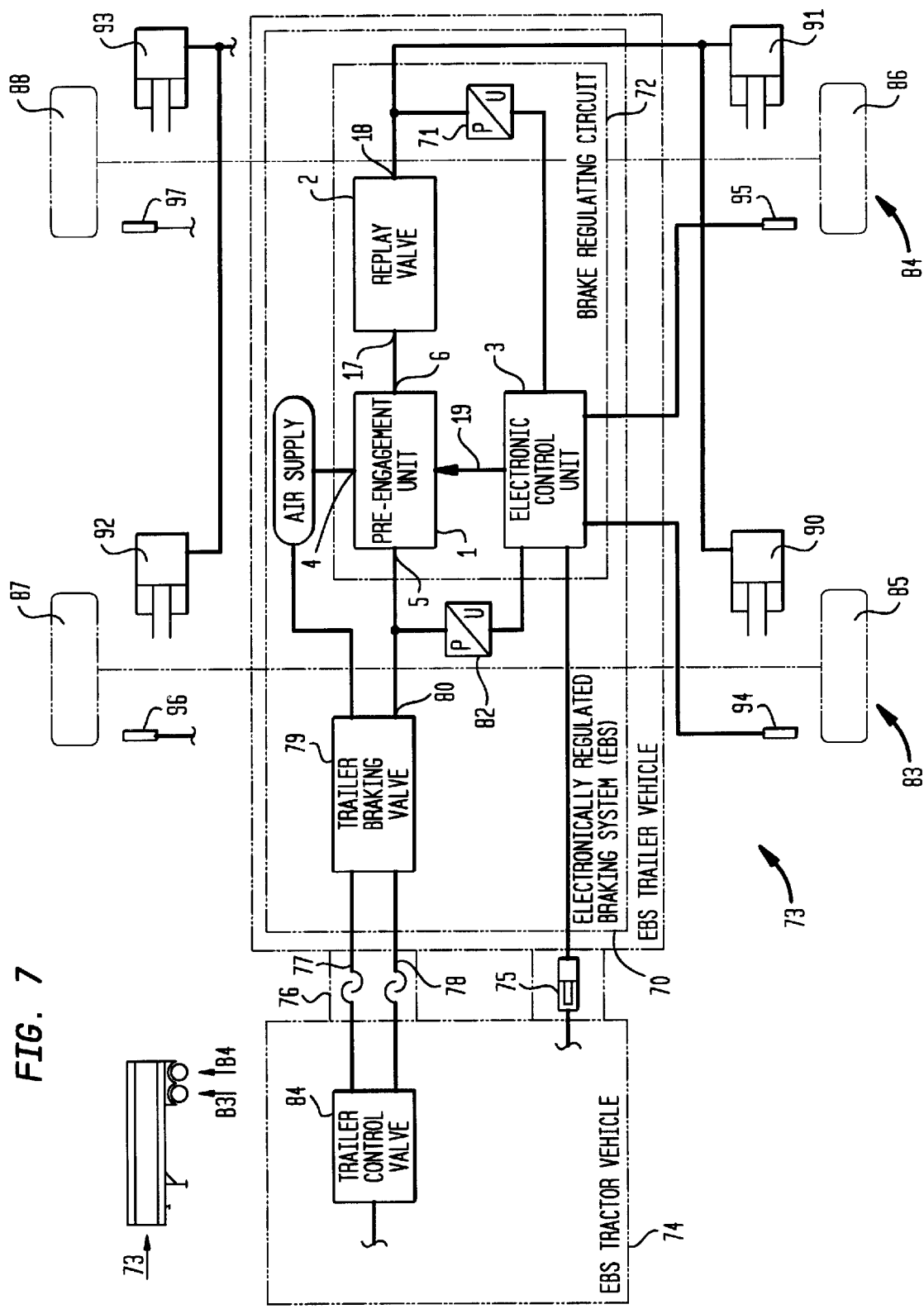
FIG. 7 shows in schematic form a tractor-trailer combination which includes the inventive pre-engagement unit in the trailer vehicle.

Referring first to FIG. 7, an electronically regulated braking system (EBS) (70) for a trailer vehicle has several brake regulating circuits working independently of each other for the wheel brakes of the vehicle (multi-channel system). A brake regulating circuit (72) which represents a pressure regulating channel for a wheel brake consists of a pre-engagement unit (1) made up of solenoid valves, an air-augmenting relay valve (2), at least one brake cylinder (e.g., 90 or 91) for the wheel brakes, a braking pressure sensor (71) installed at a suitable location, and an electronic control unit (3) which carries out the braking pressure regulation.

The brake regulating circuit for the different channels of the multi-channel system are of identical construction, so that the description of one brake regulating circuit (e.g., 72) also describes the other brake regulating circuits. The embodiment described herein is based on the configuration of a basic variant for a trailer EBS system of a semi-trailer having two axles (83, 84). The trailer EBS system is a 4S/2M system (four ABS sensors (94, 95, 96, 97) for four wheels (85, 86, 87, 88) and two modulator channels (e.g., 72) for the wheel brakes of the left (90, 91) or right (92, 93) side). The braking pressure regulation is therefore carried out per side.

As shown in FIG. 7, the EBS trailer vehicle (73) is connected to an EBS tractor vehicle (74) via an electrical (75) and via a pneumatic (76) interface. The electrical interface (75) consists of the digital data interface according to ISO 1199-2. The pneumatic interface (76) consists first of the supply channel (77) which supplies air to the trailer, and secondly of the braking line (78) which is connected in the trailer to a trailer braking valve (79). The trailer braking valve (79) puts out a braking pressure at its pneumatic output terminal (80) which is derived from the braking pressure transmitted in the pneumatic braking channel (78) and refers to it.

On the side of the EBS tractor vehicle (74), the supply (77) and control (78) lines are connected to a trailer control valve (81). The combination of the trailer control valve (81) and the trailer braking valve (79) provides security against a tear-off condition as is known from a conventionally braked vehicle combination (tractor vehicle/trailer vehicle). (As used herein, the term "tear off condition" refers to a condition wherein the two air tubes connecting the trailer to the tractor become separated or are "torn off." Due to a safety feature implemented in the trailer and tractor valves. automatic braking of the trailer takes place when this condition occurs.) In case of such a tear-off condition, the trailer braking valve also transmits a braking pressure in the known manner.

Since the tear-off protection is made as stated in the same manner as for a conventionally braked vehicle, the EBS trailer vehicle (73) can also be operated behind a tractor vehicle with a conventional braking system. Therefore, the trailer braking valve (79) in the EBS trailer vehicle (73) also contains the required functions of a conventional trailer braking valve in conventional braking systems, such as tear-off function and check valve.

In the trailer vehicle (73), the pressure at the pneumatic output terminal (80) transmitted by the trailer braking valve (79) serves for pneumatic, redundant braking in case of an EBS failure. Furthermore, through the utilization of a pressure sensor (82), the pressure at the output terminal (80) of the trailer braking valve (79) serves to determine the electrical target value for the case that the EBS trailer vehicle (73) is operated with a conventional tractor vehicle, i.e., with a non-EBS tractor vehicle. This transmitted pressure at output terminal (80) represents the redundancy pressure in the trailer vehicle.

Figure 2:
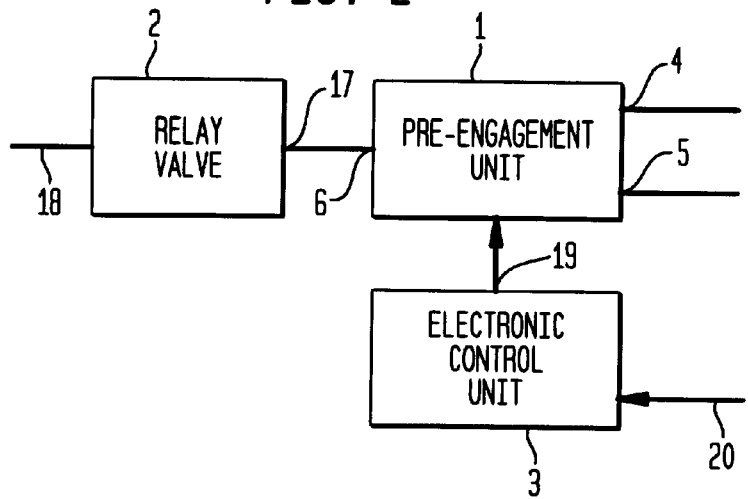
FIG. 2 shows a block diagram of a braking pressure modulator with a pre-engagement unit according to FIG. 1.

Turning now to FIG. 2, a block diagram of the braking pressure modulator shows the pre-engagement unit 1 and the functional units with which the pre-engagement unit interacts, i.e., the electronic control unit 3 and the air-quantity augmenting relay valve 2.

The pre-engagement unit 1 is provided with a first pneumatic inlet 4 which is connected to the supply pressure, and with a second pneumatic inlet 5 which is connected to the pneumatic output terminal of the trailer braking valve (not shown) for transmission of the redundancy pressure. A pneumatic output terminal 6 of the pre-engagement unit 1 is connected to the inlet 17 of the relay valve 2.

The electrical interface is connected via a line 20 to the electrical control unit 3 for the transmission of the set electrical brake value, and electrical control lines 19 coming from the electronic control unit 3 are provided for the solenoid valves of the pre-engagement unit 1.

The pneumatic output terminal 18 of the relay valve 2 is connected to the brake cylinders (not shown) of this brake regulating circuit.

Figure 1:
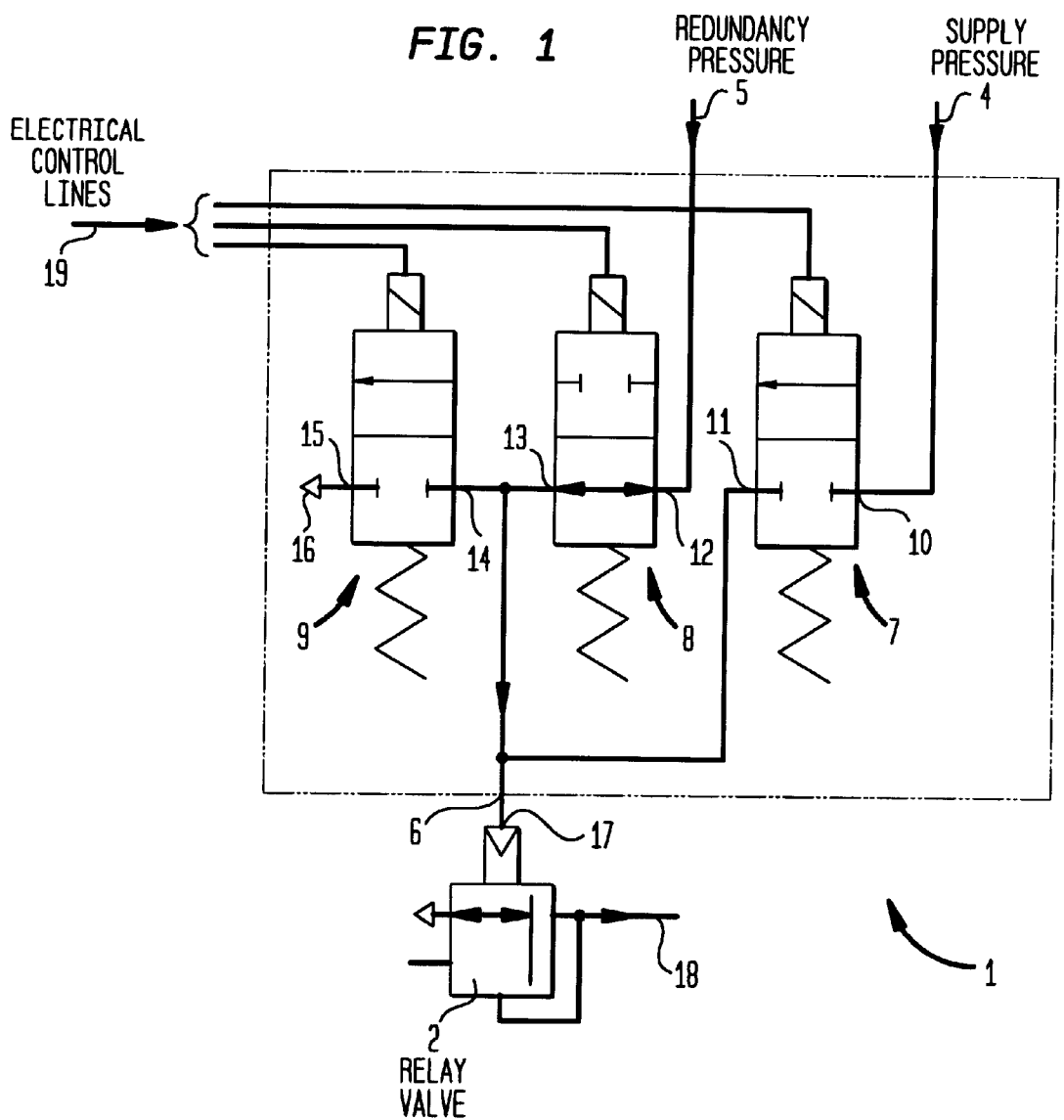
FIG. 1 shows the inventive pre-engagement unit of a braking pressure modulator for a brake regulating circuit.

As shown in FIG. 1, three solenoid valves are provided in the pre-engagement unit 1. A first solenoid valve 7 has a first terminal 10 and a second terminal 11, a second solenoid valve 8 has a first terminal 12 and a second terminal 13, and a third solenoid valve 9 has a first terminal 14 and a second terminal 15.

The first terminal 10 of the first solenoid valve 7 is connected to the first pneumatic inlet 4 of the pre-engagement unit 1, the first terminal 12 of the second solenoid valve 8 is connected to the second pneumatic inlet 5 of the pre-engagement unit 1, the second terminal 11 of the first solenoid valve 7 is connected to the pneumatic output terminal 6 of the pre-engagement unit 1, the second terminal 13 of the second solenoid valve 8 is connected to the first terminal 14 of the third solenoid valve 9 and to the pneumatic output terminal 6, and the second terminal 15 of the third solenoid valve 9 is connected to a pressure sink 16.

The first solenoid valve 7 and the third solenoid valve 9 are made in the form of normally closed 2/2-way solenoid valves, while the second. solenoid valve 8 is made in the form of a normally open 2/2-way solenoid valve.

The solenoid valves 7, 8, and 9 of the pre-engagement unit 1 serve to determine the pressure in the control chamber of the relay valve 2. They are operated in a pulsating manner.

In its unactuated state, the second solenoid valve 8 is open and serves to transmit the redundancy pressure from the second pneumatic inlet 5 of the pre-engagement unit 1 into the control chamber of the relay valve 2, when the other solenoid valves 7 and 9 are not actuated. This redundancy pressure valve thus serves as an air admission valve as well as an exhaust valve for the control chamber pressure. In the actuated (closed) state, the second solenoid valve 8 cuts off the redundancy pressure from the control chamber of the relay valve 2.

The first solenoid valve 7 is designed as an air admission valve through its connection to the supply pressure at inlet 4, and the third solenoid valve 9 serves as an exhaust valve for the control chamber of the relay valve 2 through its connection to the pressure sink 16.

The solenoid valves 7, 8 and 9, contrary to the series connection of the valves according to the DE 42 27 084 A1, are connected in parallel to each other, so that they can be actuated simultaneously.

Thus, for example, in case of full braking when the air admission valve 7 is actuated to increase the pressure, the redundancy valve 8 can remain at the same time in its non-actuated (open) position. The redundancy pressure which increases during full braking assists the admission of air into the control chamber of the relay valve 2, so that the pressure build-up time is shortened. During exhaustion of a brake, the redundancy valve 8 can also remain in the non-actuated (open) state while the exhaust valve 9 is actuated, so that the time required for the pressure drop of the control-chamber pressure in the relay valve 2 is also shortened.

Due to the identical nature of the magnet coils and the armatures of the solenoid valves 7, 8 and 9, as mentioned below, these valves present an identical switching behavior so that a desired time response of pressure build-up and pressure drop in the control chamber of the relay valve 2 can be obtained in a very controlled manner by selecting suitable actuation times for the solenoid valves.

Figure 3:
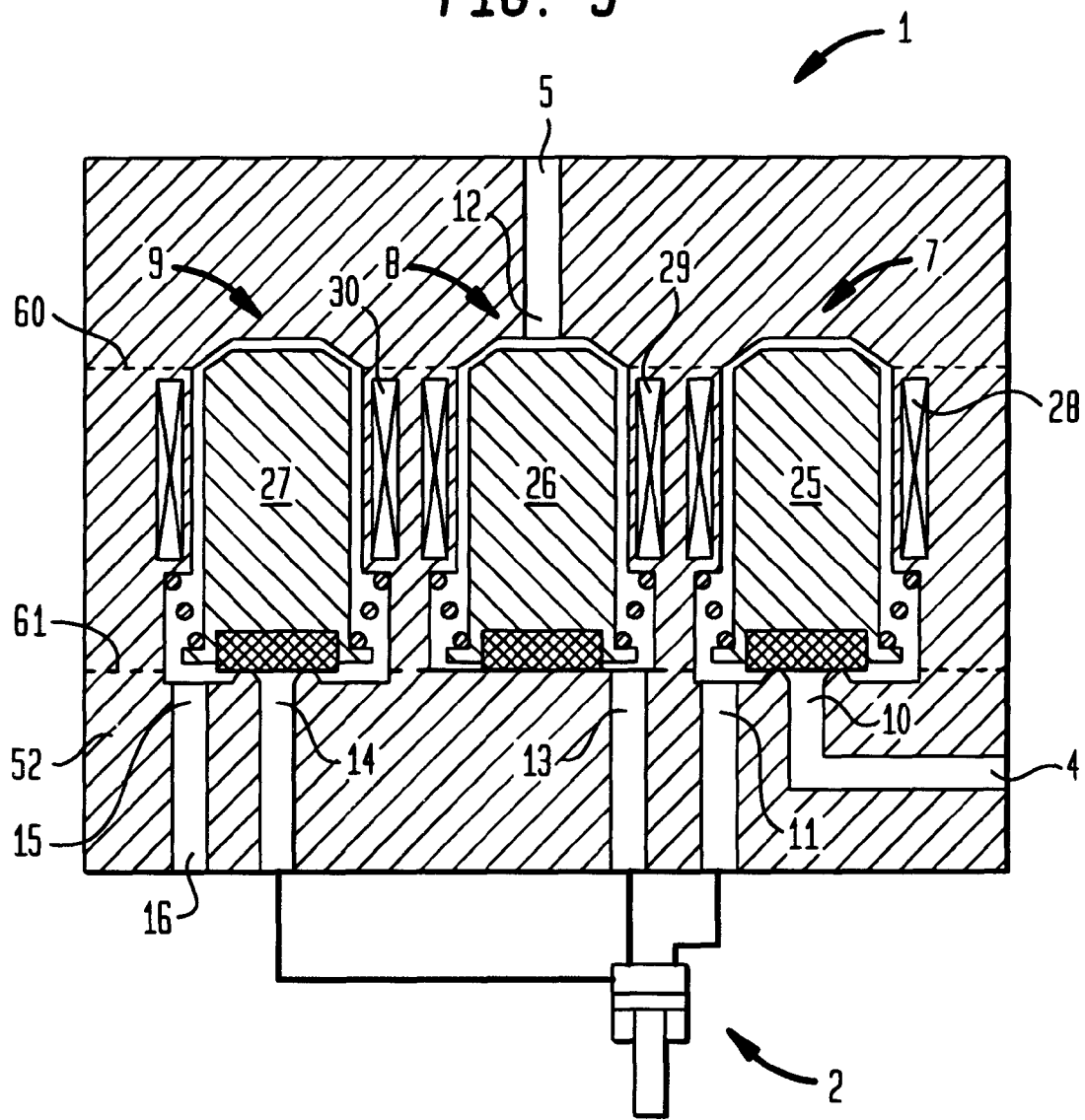
FIG. 3 shows a valve design for a pre-engagement unit according to FIG. 1.

FIG. 3 shows the detailed construction of the solenoid valves 7, 8, and 9 in a valve block having appropriate connecting conduits or channels. The armature 25 of the solenoid valve 7 is of the same construction as the armature 26 of the solenoid valve 8 and as that of the armature 27 of the solenoid valve 9. It should be noted that FIG. 3 shows the interconnection of the terminals 11, 13 and 14 of the pneumatic output terminal 6 of the pre-engagement unit 1 according to the preceding description.

The solenoid valves contain magnetic-flow bundling ferromagnetic yokes that increase the magnetic force in a suitable manner. In the housing of the valve block containing the solenoid valves are also magnetic-flow bundling elements which act to increase the magnetic force and are made in a suitable form, e.g., of ferromagnetic materials. For the sake of simplification and greater clarity the magnetic-flow bundling elements, as components of the valve-block housing or of the magnet coils 28, 29, 30, are not shown.

In FIG. 3 a first parting line 60 and a second parting line 61 are indicated by broken lines for the valve block. The first parting line 60 serves to delimit a first terminal 51 from the valve block, and the second parting line 61 serves to delimit a second terminal 52, so that between the two parting lines a triple magnet coil unit is constituted. This represents an embodiment of the invention which is described in more detail in connection with FIG. 5.

FIGS. 4a–4f show how different functions can be realized by using identical magnet coils. The reference numbers are uniform for the different valve variants, so that they can be transferred directly from one valve design to another valve design.

A normally closed 2/2-way solenoid valve 43 is shown in FIG. 4a in the currentless position of the magnet coil 38. Since no magnetic force acts in this position, the armature 39 is displaced by the force of the armature return spring 40 against a valve lift stop where a sealing seat 31 is provided at this location. An elastomer insert 41 is pressed against the sealing seat 31 and the first terminal 35 is hermetically sealed off from the second terminal 36.

A normally closed 2/2-way solenoid valve 44 is shown in FIG. 4b in the current flowing state of the magnet coil 38. The armature 39 is pressed by the magnetic force against a valve lift stop 33, the valve seat 31 opens, and the first terminal 35 is connected to the second terminal 36.

The next valve variant shows in FIG. 4c a normally open 2/2-way solenoid valve 45 in the currentless switching state. Under the action of the armature return spring 40, the armature 39 is pressed against a valve lift stop 32 which, however, is not equipped with a sealing seat in this case. In this switching position, the first terminal 35 is connected to the second terminal 36.

The normally open 2/2-way solenoid valve 46 is shown in FIG. 4d in the switching state under current. The armature 39 is pressed against a valve lift stop 34 and due to the shaped surface 42 on the armature 39 constitutes at this point a metal-to-metal valve seat together with the second terminal 36. The first terminal 35 is separated from the second terminal 36. The metal-to-metal valve seat, contrary to the valve seat described earlier using the elastomer insert 41, is not hermetically sealing, i.e., leakage occurs. As explained below, the pneumatic circuit technology used for the utilization of these valves is selected so that these leakages are of no importance.

Although such a valve is not needed with the pre-engagement unit of the present invention, FIGS. 4e. and 4f show for the sake of completeness that by using the same armature 39, it is also possible to constitute the 3/2-way solenoid valves 47 and 48.

In FIG. 4e, the 3/2-way solenoid valve 47 is shown in the currentless switching state of the magnet coil 38. Under the action of the armature return spring 40, the armature 39 is pressed against the valve lift stop 31 with the sealing seat. The first terminal 35 is separated from the third terminal 37 via this valve seat, but a connection exists between the first terminal 35 and the second terminal 36.

In FIG. 4f, the 3/2-way solenoid valve 48 is shown in its state under current. The magnetic force causes the armature 39 to be pressed against the valve lift stop 34 with its shaped surface 42 constituting a metal-to-metal sealing seat. As a result, the first terminal 35 is separated from the second terminal 36, but the first terminal 35 is connected to the third terminal 37.

By comparison with the pneumatic circuit of FIG. 1 which utilizes the valve design according to FIG. 3, it is shown that in the rest position of the pre-engagement unit which is given by the currentless switching state of all three solenoid valves 7, 8 and 9, only hermetically sealing valve seats are being used under the effect of the armature return spring. Thus, the solenoid valves 7 and 9 are closed and the solenoid valve 8 is open in the currentless switching state.

Only when a desired change takes place in the control chamber pressure in the relay valve 2 is the air admission valve 7 actuated to increase the pressure, or the exhaust valve 9 is actuated to decrease the pressure, each in pulsating fashion.

If the influence of the redundancy pressure is to be eliminated with this pressure increase or pressure reduction, the redundancy pressure valve 8 is actuated and the redundancy pressure appearing at the second pneumatic inlet 5 is separated from the relay valve control chamber (pneumatic output terminal 6) by the metal-to-metal valve seat which takes effect in this switching state.

Since leakage may occur at this valve seat as mentioned earlier, the separation is not hermetical, i.e., the existing redundancy pressure will influence the control chamber pressure in the relay valve 2 to a small extent by the valve seat leakage. This influence is unimportant, however, since, as explained before, a pulsating air admission takes place at the same time through the air admission valve 7, or a pulsating exhaust takes place through the exhaust valve 9, with the full cross-sections of these valves taking effect in either case. The leakage cross-section is on the one hand extraordinarily small as compared to the valve cross-sections, and on the other hand pulsation is carried out in a closed regulation loop, i.e., air admission or exhaust pulsation takes place, until the braking pressure delivered at the pneumatic output terminal 18 of the relay valve 2 is equal to a target braking pressure calculated by the electronic control unit. (The calculation of the target braking pressure value in the electronic control unit is based, in addition to the electrical braking set value, on additional influence factors caused by load or ABS brake regulation.) When the target braking pressure value is reached, pulsation is terminated and the solenoid valves 7 and 9 are placed again in the currentless switching state; the redundancy valve 8 continues to remain actuated. If a minute exhaust of the control chamber of the 2 should now occur due to the metal-to-metal valve seat, recognized by a lowering of pressure at the pneumatic output terminal 18, this lowering of pressure is compensated for within the framework of pressure regulation by means of a single pulsation of the air admission valve 7.

When a valve seat is closed by the. magnetic force and after the magnet coil is first subjected to current, only a low magnetic force flow is built up due to the distance in space between the armature and the valve seat (the ferromagnetic circuit is not closed). In order to move the armature at all, a strong current must produce a strong actuating force which is only a fraction of the subsequent holding force for the armature. Due to the constant feeding of a very strong current, the armature of a solenoid valve is accelerated and thereby kinetic energy is built up which is dissipated again when the armature touches the valve seat.

In conventional valves according to the state of the art, an elastomer insert produces the seal at the valve seat.

Figure 4:
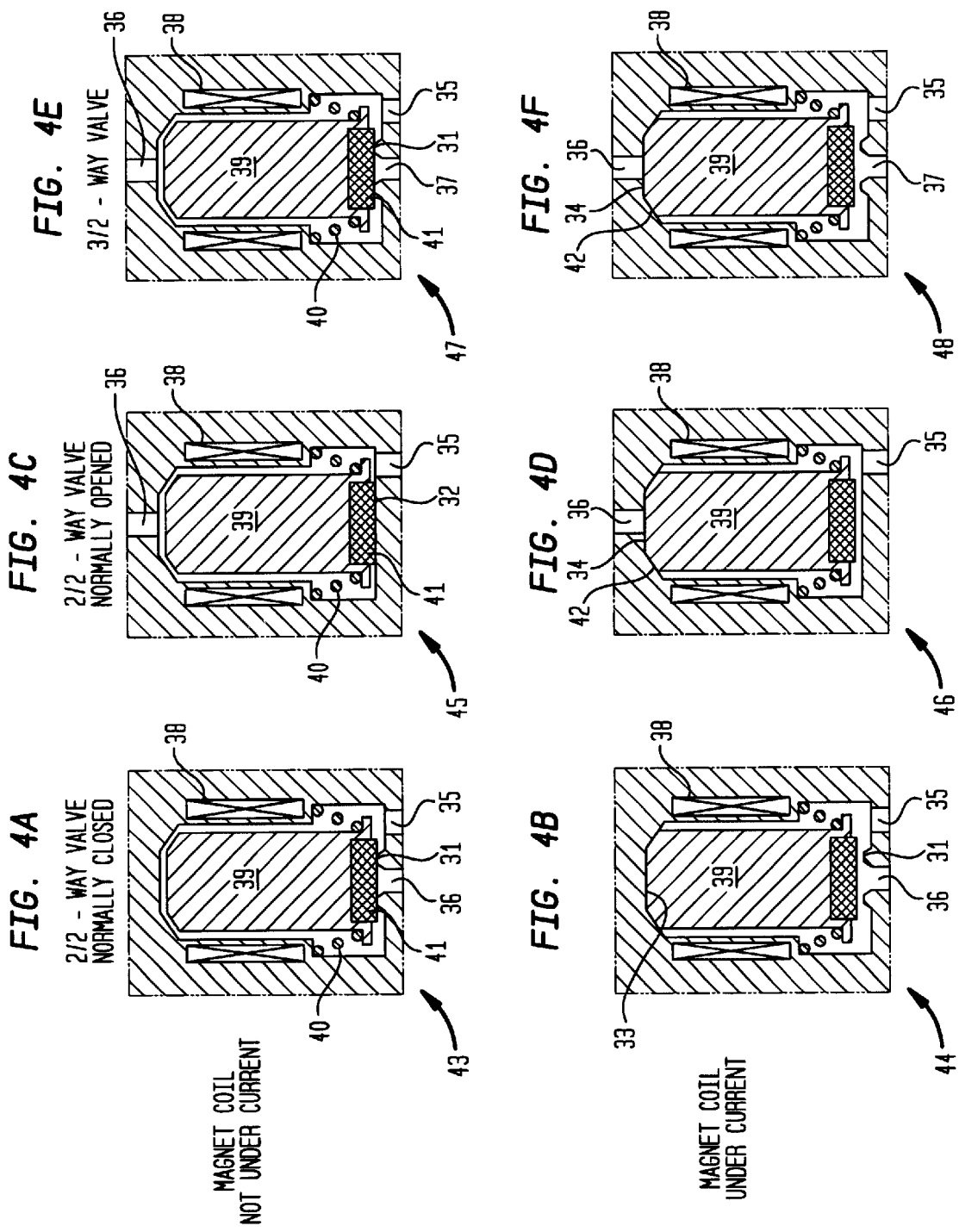
FIGS. 4a–4f show several designs of an armature and its integration in a magnet coil in order to constitute a hermetically sealing valve seat for the magnet when not under current, and a non-hermetically sealing metal-to-metal valve seat for the magnet when under current.

In order to avoid the destruction of the elastomer during a lasting load by the dissipation of the kinetic accelerating energy of the armature when it meets the valve seat, such an elastomer insert is not connected rigidly but elastically to the body of the armature. In the German patent document DE 27 57 803 A1, FIG. 4 shows an armature with two elastomer sealing inserts (therein 50' and 52') for two valve seats that are supported elastically (therein by springs 51 and 53). An elastic sealing seat of this type of construction requires a relatively long valve stroke that may be, e.g., 1.2 mm long so that the spring action may be at all effective. Such a construction also requires a certain minimum structural size so that an elastic construction may fit in, and this leads to a relatively large armature mass that in turn requires a corresponding reinforcement of the armature return spring. The stronger return spring then leads to an increase of the required magnetic force to about 30 N with such a valve seat construction. The switching time (current supplied to the magnet coil until the valve seat closes) is essentially the time required to build up the current in the magnet coil and is typically on the order of 25 ms.

In applications for pre-engagement, these valves must normally have a nominal width of approximately 2.2 mm in order to avoid a sharp pressure drop that may occur through the compressed air pilot lines which bridge the distance between a valve and the air accumulating relay valve control chamber.

When these type of pre-engagement valves are operated in a closed pressure regulation mode, the nominal value of approximately 2.2 mm causes the emitted pressure not to be very fine-tuned by steps and the switching time of approximately 25 ms leads with a conventional scanning regulator to a limitation of the obtainable pressure gradient of the emitted pressure used.

With a valve design according to the present invention, however, and due to the fact that the armature has an elastomer insert at only one end and not at both ends, and due also to the fact that on the opposite end of same there is only a shaped surface to constitute a metal-to-metal sealing seat, it is possible to employ a small structural form for the armature. As a result, the mass of the armature is reduced to approximately 6 g and due to the weak armature return spring, a magnetic force of only approximately 6 N is required.

Providing the armature with a shock absorbing coating as suggested in the German patent document DE 197 30 276 A1 ensures suitable resistance to acceleration of the shaped surface at the metal-to-metal sealing seat.

Due to the fact that the sealing in a metal-to-metal sealing coat is not achieved by compressing the elastomer and that no range of spring is necessary, a very short valve stroke of approximately 0.5 mm can be employed. With this short valve stroke and the already weak armature return spring, an elastic support of the elastomer insert as in the above-mentioned state of the art is no longer necessary.

With a small armature, only a small magnet coil is needed. Due to these small dimensions, it is then possible, as explained below, to provide a triple magnet coil unit in which the armatures together with the return springs are integrated into a compact, preassembled unit. This small-size assembly also makes it possible to provide short bores for the channel going to the relay valve 2 without unacceptable throttling of the compressed air.

Thanks to these optimized compressed air connections, the nominal width of a solenoid valve can be reduced to a value around 1.7 mm, representing an optimal value for a pilot valve in vehicle applications. It ensures on the one hand that the braking pressure can be well transmitted in steps, and on the other hand it is not so small that the usual pollution of the compressed air in vehicles would play a role.

By means of the measures described here, the switching times of the solenoid valves can be reduced to approximately 6 ms instead of the 25 ms typical of the state of the art. With the reduced switching times, rapidly changing set target values for the braking pressure regulator can be realized, and high gradients for the generated braking pressure can be realized at the output terminal 18 of the relay valve 2.

Figure 5:
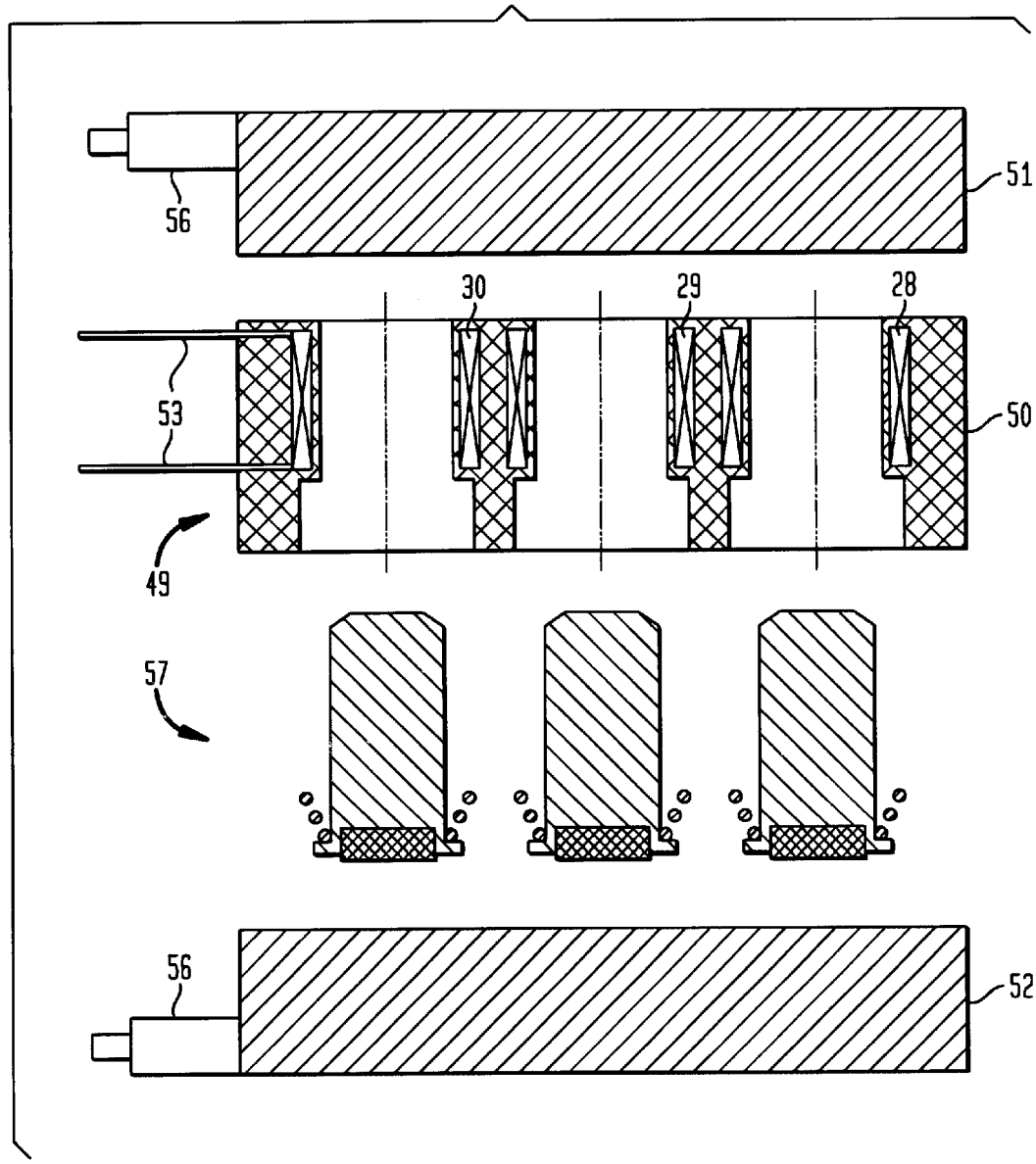
FIG. 5 shows the pre-engagement unit according to FIG. 1 in the form of a triple magnet coil unit which is made in the form of a built-in unit which is extrusion-coated with plastic.

An advantageous further development in the design of the solenoid valves according to FIG. 3 is shown in FIG. 5. The magnet coils 28, 29 and 30 of the solenoid valves 7, 8 and 9 can be combined into the compact triple magnet coil unit 49 thanks to the identical configuration of the magnet coils, this triple magnet coil unit 49 being extrusion-coated with a plastic 50.

To assemble the pre-engagement unit, the armatures collectively bearing hereinafter reference 57, are installed together with the armature return springs into the triple magnet coil 49, and the assembly of the triple magnet coil unit 49, including the armatures, is expanded into the complete pre-engagement unit by adding the first terminal 51 and the second terminal 52 to the respective faces of the triple magnet coil unit 49. The two terminals 51, 52 are then sealingly connected to the triple magnet coil unit 49 in an appropriate manner.

The terminals 51 and 52 contain bores as described in connection with FIG. 3 for the conduits (not shown in FIG. 5) of the solenoid valves 7, 8 and 9 (not shown in FIG. 5) so that the entire pre-engagement unit is ready to be installed once the sealing connection is established.

Figure 6:
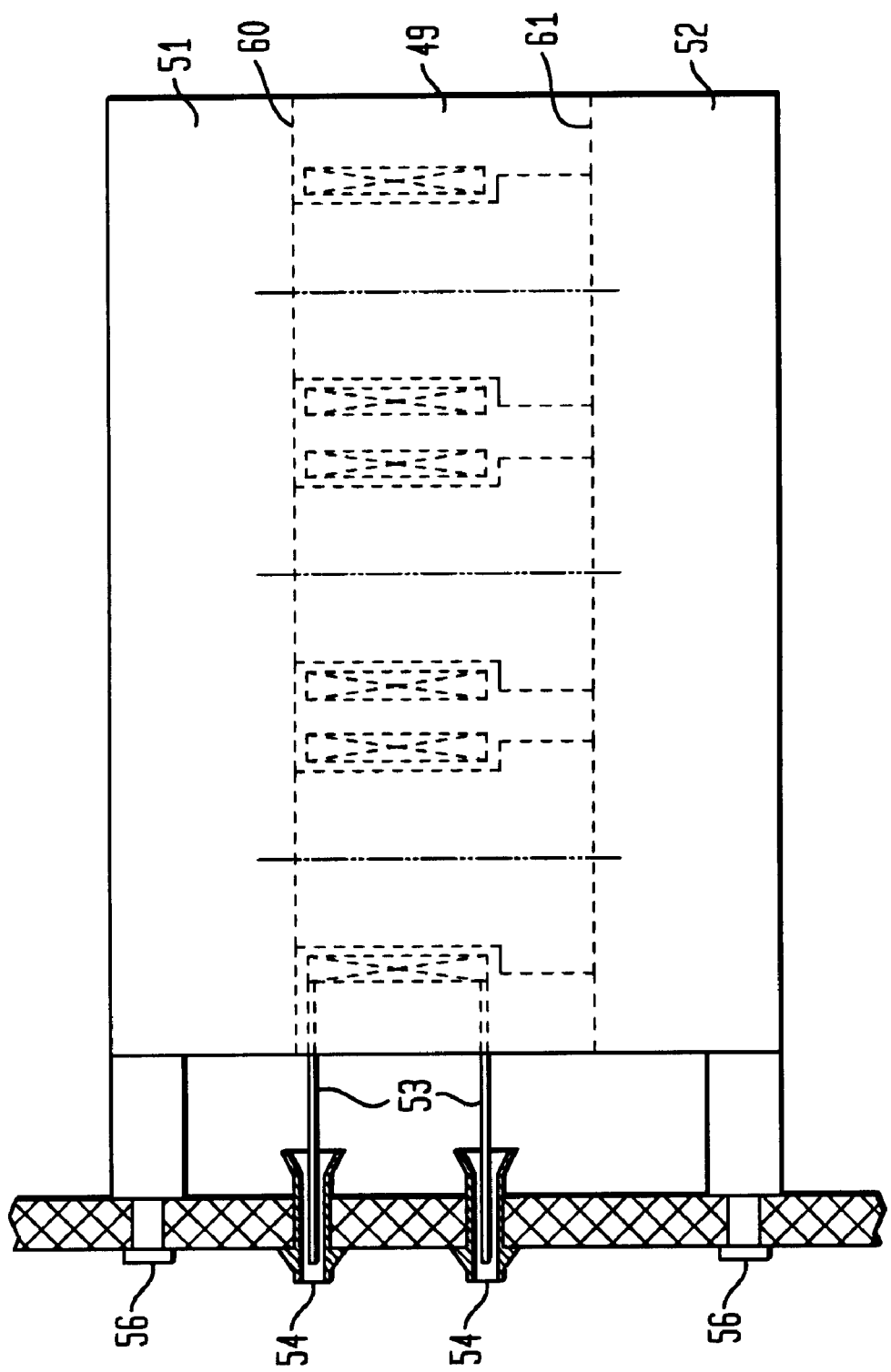
FIG. 6 shows the pre-engagement unit as a built-in unit according to FIG. 4 with electrical connections to an electronic circuit board of an electronic control system.

As shown in FIG. 6, the electrical terminals 53 of the magnet coils can be advantageously brought out of the triple magnet coil unit 49 in the form of contact pins and can be plugged into corresponding receiving sockets 54 in the electronic circuit board 55 of the electronic control unit 3.

Once the terminals 53 have been plugged into the circuit board 55, one component is built by suitable fastening means. Thereby an electronic-pneumatic assembly is constituted which comprises the pre-engagement unit and the electronic control unit. This assembly then merely has to be combined with larger elements such as the relay valves in order to complete the trailer braking pressure modulator on the triple magnet coil unit 49.

While the invention has been described by reference to specific embodiments, this was for purposes of illustration only and should not be construed to limit the scope of the invention. Numerous alternative embodiments will be apparent to those skilled in the art.

What is claimed is:

1. A pre-engagement unit for a braking pressure modulator for a pressure regulating circuit of an electronic braking system, said pre-engagement unit being implemented in a trailer vehicle to be coupled to a tractor vehicle, comprising:
   a) a first pneumatic inlet through which a supply pressure is supplied to the pre-engagement unit;
   b) a second pneumatic inlet through which a redundancy pressure is supplied to the pre-engagement unit by a trailer braking valve located in said trailer vehicle, said redundancy pressure being derived from a braking pressure transmitted from said tractor vehicle to said trailer vehicle via pneumatic lines;
   c) a first pneumatic output terminal through which the pre-engagement unit is connected to an air quantity augmenting relay valve;
   d) a second pneumatic output terminal through which the pre-engagement unit is connected to a pressure sink;
   e) an electrically actuated valve system comprising first, second, and third 2/2-way solenoid valves each of which has an electric terminal which is connected to an output terminal of an electronic control unit of the electronic braking system, each of said 2/2-way solenoid valves also including first and second pneumatic terminals which are selectively connected to said first and second pneumatic inlets and said first and second pneumatic output terminals of said pre-engagement unit so that the pressure in the pressure regulating circuit can be increased, decreased, or maintained.

2. The pre-engagement unit of claim 1 wherein the first, second, and third 2/2-way solenoid valves are connected in parallel to each other.

3. The pre-engagement unit of claim 2 wherein each of said first, second, and third 2/2-way solenoid valves comprises a magnet coil and an armature, and wherein said first, second, and third 2/2-way solenoid valves are actuated in a pulsated manner.

4. The pre-engagement unit of claim 3 wherein:
   f) the first 2/2-way solenoid valve is closed in its unactuated state and serves as an air admission valve for the supply pressure to the pressure regulating circuit;
   g) the second 2/2-way solenoid valve is open in its unactuated state and serves as an air admission/exhaust valve for the redundancy pressure to the pressure regulating circuit; and
   h) the third 2/2-way solenoid valves is closed in its unactuated state and serves as an air exhaust valve for the pressure regulating circuit.

5. The pre-engagement unit of claim 4 wherein:
   i) the first pneumatic terminal of the first 2/2-way solenoid valve is connected to the first pneumatic inlet of the pre-engagement unit, and the second pneumatic inlet of the first 2/2-way solenoid valve is connected to the first pneumatic output terminal of the pre-engagement unit;
   j) the first pneumatic terminal of the second 2/2-way solenoid valve is connected to the second pneumatic inlet of the pre-engagement unit, and the second pneumatic terminal of the second 2/2-way solenoid valve is connected to the first pneumatic output terminal of the pre-engagement unit; and
   k) the first pneumatic terminal of the third 2/2-way solenoid valve is connected to the first pneumatic output terminal of the pre-engagement unit, and the second pneumatic terminal of the third 2/2-way solenoid valve is connected to the second pneumatic output terminal of the pre-engagement unit.

6. The pre-engagement unit of claim 1 wherein each of the first, second and third 2/2-way solenoid valves comprises a magnet coil and an armature which are substantially identical to each other.

7. The pre-engagement unit of claim 6 wherein the magnet coils of the first, second, and third 2/2-way solenoid valves are assembled together in a triple magnet coil unit.

8. The pre-engagement unit of claim 7 wherein the triple magnet coil unit comprises an extrusion coated unit.

9. The pre-engagement unit of claim 8 wherein the electric terminal of each of the 2/2-way solenoid valves comprises a contact pin of the individual magnet coils which is adapted to be plugged into a socket of an electronic circuit board of the electronic control unit for selective electrical actuation of the first, second, and third 2/2-way solenoid valves.

10. The pre-engagement unit of claim 1 wherein each of said first, second, and third 2/2-way solenoid valves comprises a valve housing, a magnet coil, an armature, first and second valve lift stops, and an armature return spring which urges said armature against said first valve lift stop when there is no current in the magnet coil, wherein the armature is urged against the second valve lift stop when there is current flowing in the magnet coil, wherein the first valve lift stop comprises a sealing seat which provides hermetic sealing, and wherein the second valve lift stop comprises a metal-to-metal sealing seat.

11. The pre-engagement unit of claim 10 wherein each 2/2-way solenoid valve comprises an elastomeric insert that is pressed against the first valve lift stop to provide hermetic sealing, and wherein the armature comprises a shaped surface which is pressed against the second valve lift stop to provide said non-hermetic metal-to-metal sealing seat.

12. The pre-engagement unit of claim 1 wherein each of the first, second, and third 2/2-way solenoid valves comprises a magnet coil and an armature which are substantially identical to each other, and wherein each of said first, second, and third 2/2-way solenoid valves further comprises a valve housing, first and second valve lift stops, and an armature return spring which urges said armature against said first valve lift stop when there is no current in the magnet coil, wherein the armature is urged against the second valve lift stop when there is current flowing in the magnet coil, wherein the first valve lift stop comprises a sealing seat which provides hermetic sealing, and wherein the second valve lift stop comprises a metal-to-metal sealing seat.

* * * * *

UNITED STATES PATENT AND TRADEMARK OFFICE
CERTIFICATE OF CORRECTION

PATENT NO. : 6,467,854 B2
DATED : October 22, 2002
INVENTOR(S) : Dieter Frank et al.

It is certified that error appears in the above-identified patent and that said Letters Patent is hereby corrected as shown below:

<u>Title page,</u>
Item [75], the last name of the second inventor should read -- Schreiber --

Signed and Sealed this

Twenty-sixth Day of August, 2003

JAMES E. ROGAN
*Director of the United States Patent and Trademark Office*